United States Patent
Starr et al.

(10) Patent No.: US 9,930,301 B2
(45) Date of Patent: Mar. 27, 2018

(54) RFID TAG READER STATION WITH IMAGE CAPABILITIES

(71) Applicant: INTERMEC IP CORP., Everett, WA (US)

(72) Inventors: Johanas L. Starr, Cedar Rapids, IA (US); Tom Schuster, Cedar Rapids, IA (US); John Jorgenson, Cedar Rapids, IA (US)

(73) Assignee: INTERMEC IP CORP., Lynnwood, WA (US)

(*) Notice: Subject to any disclaimer, the term of this patent is extended or adjusted under 35 U.S.C. 154(b) by 153 days.

(21) Appl. No.: 14/324,887

(22) Filed: Jul. 7, 2014

(65) Prior Publication Data

US 2014/0320649 A1 Oct. 30, 2014

Related U.S. Application Data

(63) Continuation of application No. 12/203,630, filed on Sep. 3, 2008, now Pat. No. 8,773,266.

(60) Provisional application No. 60/988,610, filed on Nov. 16, 2007.

(51) Int. Cl.

| | | |
|---|---|---|
| *G08B 13/19* | (2006.01) | |
| *H04N 7/18* | (2006.01) | |
| *G08B 13/196* | (2006.01) | |
| *G08B 13/24* | (2006.01) | |

(52) U.S. Cl.
CPC ....... *H04N 7/188* (2013.01); *G08B 13/19667* (2013.01); *G08B 13/19697* (2013.01); *G08B 13/248* (2013.01); *G08B 13/2462* (2013.01)

(58) Field of Classification Search
CPC ........ G06K 2017/0045; G07C 9/00111; G07G 1/0054; G07G 3/003; G08B 13/19645; G08B 13/19658; G08B 13/19697; G08B 13/2402; G08B 13/2417; G08B 13/2448;
(Continued)

(56) References Cited

U.S. PATENT DOCUMENTS

| | | | | |
|---|---|---|---|---|
| 5,708,425 A | * | 1/1998 | Dwyer | G08G 1/017 235/384 |
| 5,874,896 A | * | 2/1999 | Lowe | G07G 1/0054 340/13.26 |
| 5,912,980 A | | 6/1999 | Hunke | |

(Continued)

OTHER PUBLICATIONS (No author listed), "Radio-Frequency Identification," Wikipedia internet encyclopedia, Oct. 29, 2007, 23 pp., Internet address: http://en.wikipedia.org/wiki/Rfid.

*Primary Examiner* — Fekadeselassie Girma
(74) *Attorney, Agent, or Firm* — Oliff PLC; R. Brian Drozd

(57) ABSTRACT

A system and method is provided for image surveillance of areas of interest for items having radio frequency identification (RFID) tags. These areas of interest are often times unmonitored due to privacy concerns. The present invention discloses an image surveillance system and method, that upon indication of an RFID tag coming within proximity of a portal system having an RFID reader, records one or more images of the area of interest, so as to capture a subject associated with the RFID tagged item moving into or through the area of interest. Such applications for embodiments of the present invention are directed to monitor items of interest in retail stores, restaurants, shipping and receiving locations, and other public areas.

20 Claims, 9 Drawing Sheets

(58) Field of Classification Search
CPC . G08B 13/246; G08B 13/248; G08B 13/2482
USPC .......................................... 340/572.1, 568.1
See application file for complete search history.

(56) References Cited

U.S. PATENT DOCUMENTS

| | | | |
|---|---|---|---|
| 6,654,060 B1* | 11/2003 | Kurosawa | H04N 5/23203 348/14.04 |
| 6,686,841 B1* | 2/2004 | Busch | G08B 13/1454 340/568.1 |
| 6,970,183 B1 | 11/2005 | Monroe | |
| 7,180,050 B2 | 2/2007 | Imagawa et al. | |
| 7,999,656 B2* | 8/2011 | Fisher | G07C 9/00103 340/5.73 |
| 8,451,088 B2* | 5/2013 | Fisher | A47G 29/10 340/5.73 |
| 2002/0016740 A1 | 2/2002 | Ogasawara | |
| 2002/0149681 A1* | 10/2002 | Kahn | G01S 3/7864 348/211.99 |
| 2003/0043040 A1* | 3/2003 | Zeps | G06F 21/554 340/573.1 |
| 2003/0043041 A1* | 3/2003 | Zeps | G06F 21/554 340/573.1 |
| 2003/0221119 A1* | 11/2003 | Geiger | G06F 11/324 726/4 |
| 2004/0105006 A1* | 6/2004 | Lazo | G07C 9/00111 348/169 |
| 2004/0201738 A1* | 10/2004 | Moores, Jr. | H04N 1/00137 348/231.2 |
| 2005/0110610 A1 | 5/2005 | Bazakos et al. | |
| 2005/0143133 A1* | 6/2005 | Bridgelall | H01Q 1/007 455/562.1 |
| 2005/0219375 A1* | 10/2005 | Hasegawa | G08G 1/0175 348/211.2 |
| 2006/0064384 A1* | 3/2006 | Mehrotra | G01S 3/7864 705/57 |
| 2006/0082439 A1 | 4/2006 | Bazakos et al. | |
| 2007/0080806 A1* | 4/2007 | Lax | E05B 73/0017 340/572.1 |
| 2007/0126583 A1 | 6/2007 | Maniwa et al. | |
| 2007/0182818 A1* | 8/2007 | Buehler | G08B 13/19602 348/143 |
| 2007/0200930 A1* | 8/2007 | Gordon | H04N 5/222 348/159 |
| 2008/0092610 A1 | 4/2008 | Kuo et al. | |
| 2008/0270922 A1 | 10/2008 | Kii et al. | |
| 2009/0257589 A1* | 10/2009 | Yokota | H04N 7/18 380/216 |
| 2010/0097221 A1* | 4/2010 | Kreiner | G01S 13/82 340/572.1 |
| 2012/0268597 A1* | 10/2012 | Mizuno | G06Q 50/22 348/143 |
| 2013/0175121 A1* | 7/2013 | Hanninen | B66B 1/2491 187/380 |

\* cited by examiner

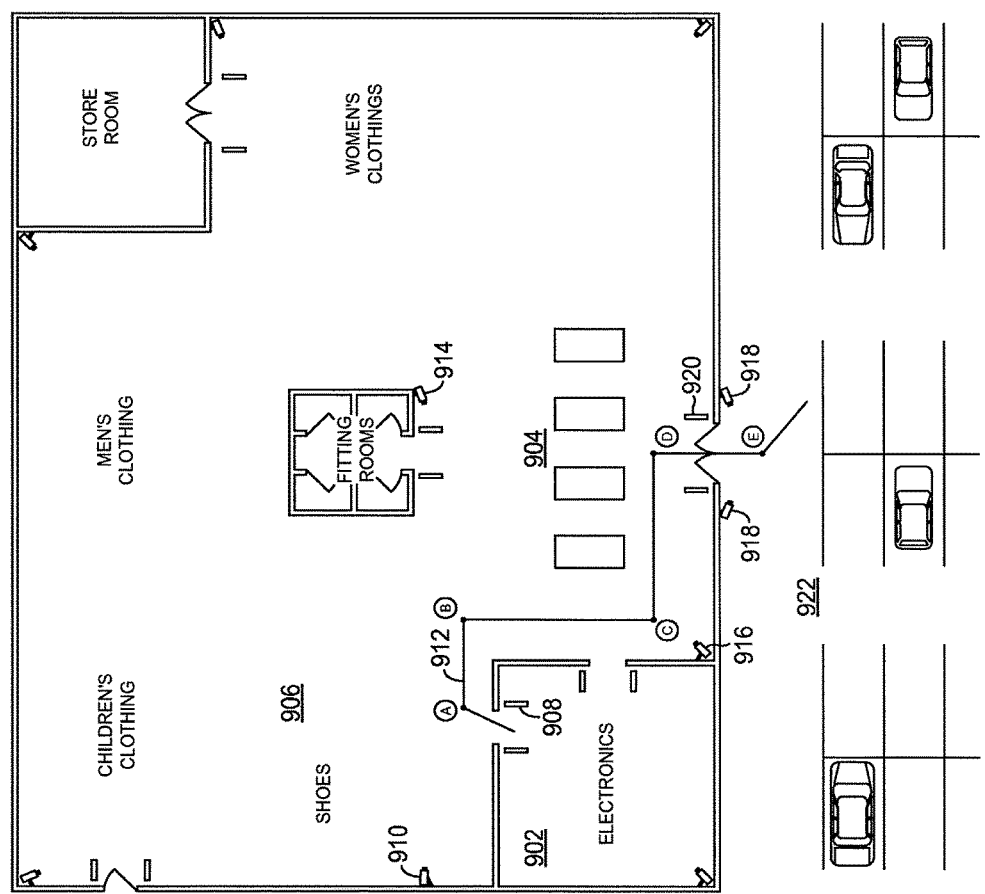

RFID TAG READER STATION WITH IMAGE CAPABILITIES

CROSS-REFERENCE TO RELATED APPLICATIONS

This is a Continuation of application Ser. No. 12/203,630 filed Sep. 3, 2008, which claims the benefit of U.S. Provisional Application No. 60/988,610 filed Nov. 16, 2007. The disclosure of the prior applications is hereby incorporated by reference herein in its entirety.

STATEMENT REGARDING FEDERALLY SPONSORED RESEARCH OR DEVELOPMENT

Not applicable.

TECHNICAL FIELD

The present invention relates to surveillance systems used for monitoring a variety of items having radio frequency identification (RFID) tags. More particularly, the present invention also relates to image recording of a monitored item when the monitored item approaches or crosses into an area of interest.

BACKGROUND OF THE INVENTION

Operators of many retail stores and locations available to the general public utilize various surveillance and security equipment for protecting their property and products. Often times surveillance systems have the capability to record still images and/or a video stream of areas of interest, while typical security equipment includes alarms and monitors at entry and exit points for detecting specifically tagged merchandise.

However, there are a number of areas within retail and public locations that cannot be monitored by surveillance systems due to privacy issues. These areas include restrooms, fitting rooms, or other enclosed areas not accessible to the general public. These areas are often used by potential thieves, as they are aware that privacy laws prohibit surveillance of these specific areas. For example, shoplifters can take an item, such as a garment, into a dressing room or restroom, remove any security tags attached to the garment, leave the tags behind, and then exit the premises with the garment unbeknownst to store personnel, security, or surveillance equipment.

SUMMARY OF THE INVENTION

The present invention generally relates to a system and method for surveillance of areas that are often times unmonitored due to privacy concerns of the customers. In particular, the present invention discloses an image surveillance system to monitor items having a radio frequency identification (RFID) tag.

In a first aspect, a data and image surveillance system is disclosed comprising a processing unit that is in communication with one or more portal systems. Each of the one or more portal systems has one or more RFID reader units capable of detecting when an RFID tag comes within a specified proximity of the RFID reader unit. The system further comprises an image surveillance device that is in communication with the one or more portal systems and the processing unit. Upon indication of a triggering event, such as when an item having an RFID tag is within proximity of the one or more portal systems, the image surveillance device records one or more images of the item having the RFID tag and its location.

In another aspect, a method of providing a data and image surveillance is disclosed. The method, which is in the form of computer-useable instructions embodied on one or more computer-readable storage media, comprises monitoring an area of interest for a presence of a RFID tag, determining the presence of the RFID tag in the area of interest, and recording one or more images of the area of interest through an image surveillance device. An indication of the presence of the RFID tag within the area of interest is also transmitted to one or more monitoring systems.

In yet another aspect, a video-based RFID tag surveillance system is disclosed. The surveillance system comprises at least one portal system located adjacent to an area of interest and having one or more RFID tag readers. The at least one portal system is in communication with a video surveillance device having at least one recording component for capturing one or more images of the area of interest upon indication of a triggering event.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
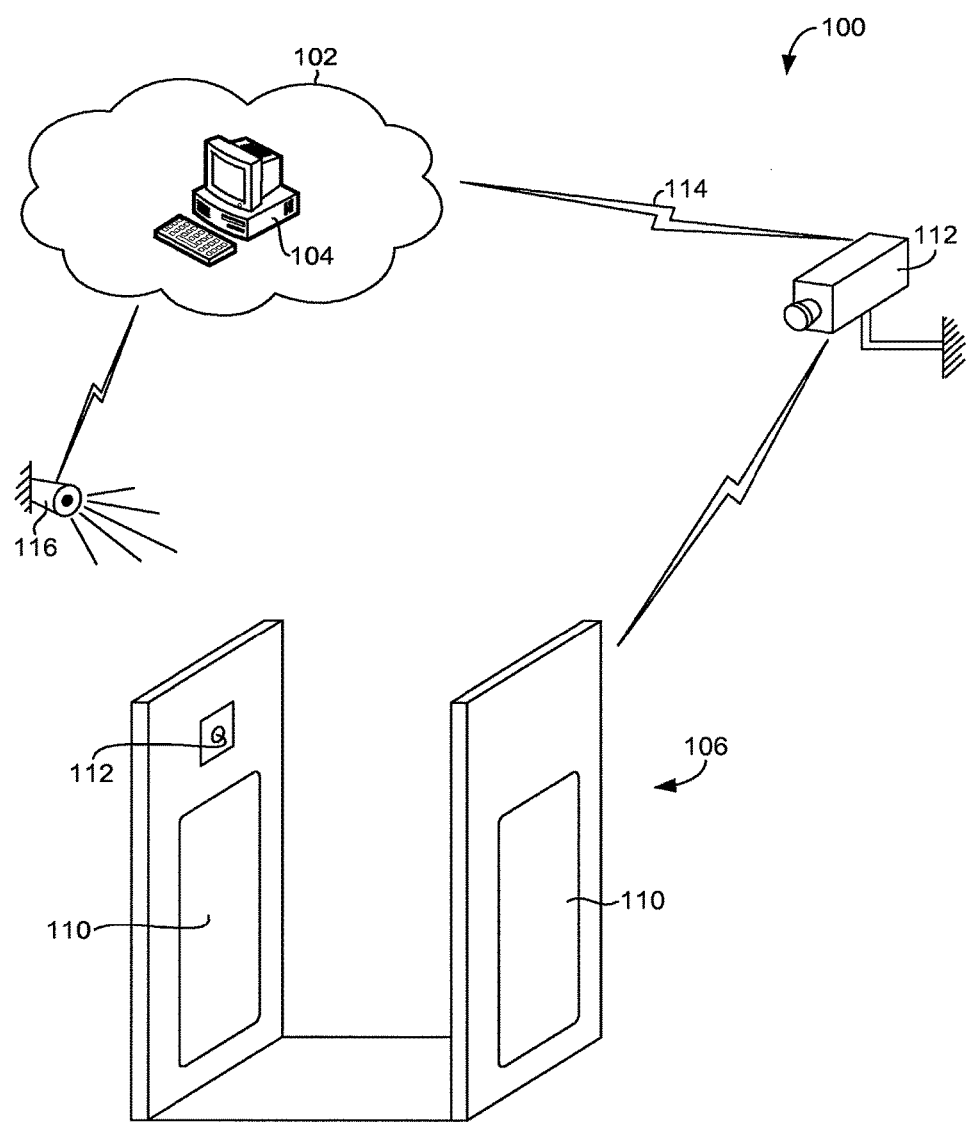
FIG. 1 is a schematic view of a wireless data and image surveillance system in accordance with an embodiment of the present invention.

The present invention provides a system and method for a radio frequency identification (RFID) tag and image surveillance system for monitoring an area of interest. In an embodiment of the present invention, a data and image surveillance system is disclosed. Referring initially to FIG. 1, a surveillance system 100 comprises a processing unit 102 that has at least a memory component 104. An example of a processing unit 102 is a typical computing device capable of data processing and storage of data and image files on the memory component 104 of the computing device.

Figure 2:
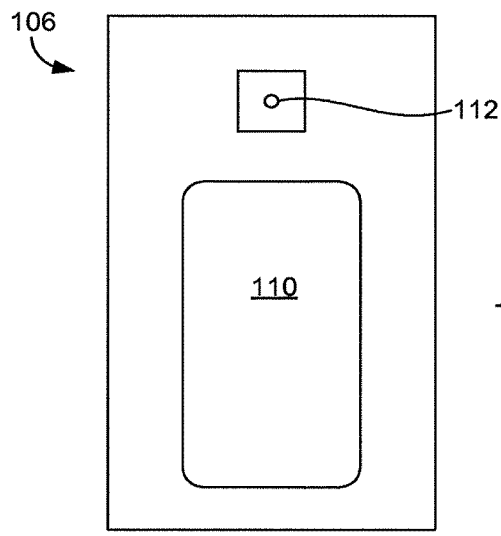
FIG. 2 is an elevation view of a portal system component of FIG. 1 in accordance with an embodiment of the present invention.
Figure 3:
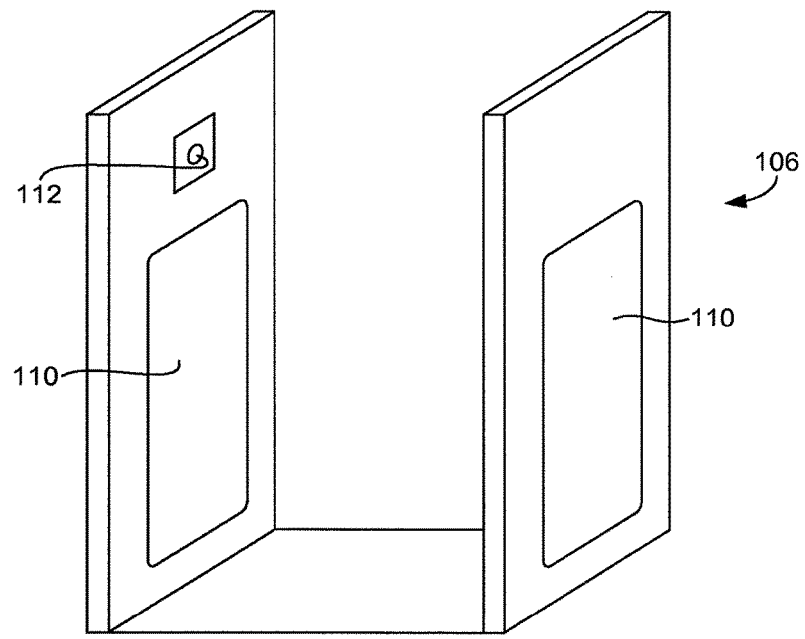
FIG. 3 is a perspective view of a portal system component of FIG. 1 in accordance with an embodiment of the present invention.

The surveillance system 100 also comprises one or more portal systems 106 that are positioned adjacent to an area of interest 108 wherein the one or more portal systems 106 has one or more radio frequency identification (RFID) reader units 110 in communication with the processing unit 102. Additional views of the portal system 106 are shown in FIGS. 2 and 3. In communication with the one or more portal systems 106 and the processing unit 102 is an image surveillance device 112. The image surveillance device 112 comprises a camera mounted adjacent to the area of interest 108 or can be mounted to the portal system 106. The camera can be a still image camera or a video camera and may or may not also include a microphone component for recording sound. For the embodiment depicted in FIG. 1, the communication between the portal system 106, surveillance device 112, and processing unit 102 occurs across a wireless network 114. The wireless network 114 is most typically a secured local area network.

Figure 4:
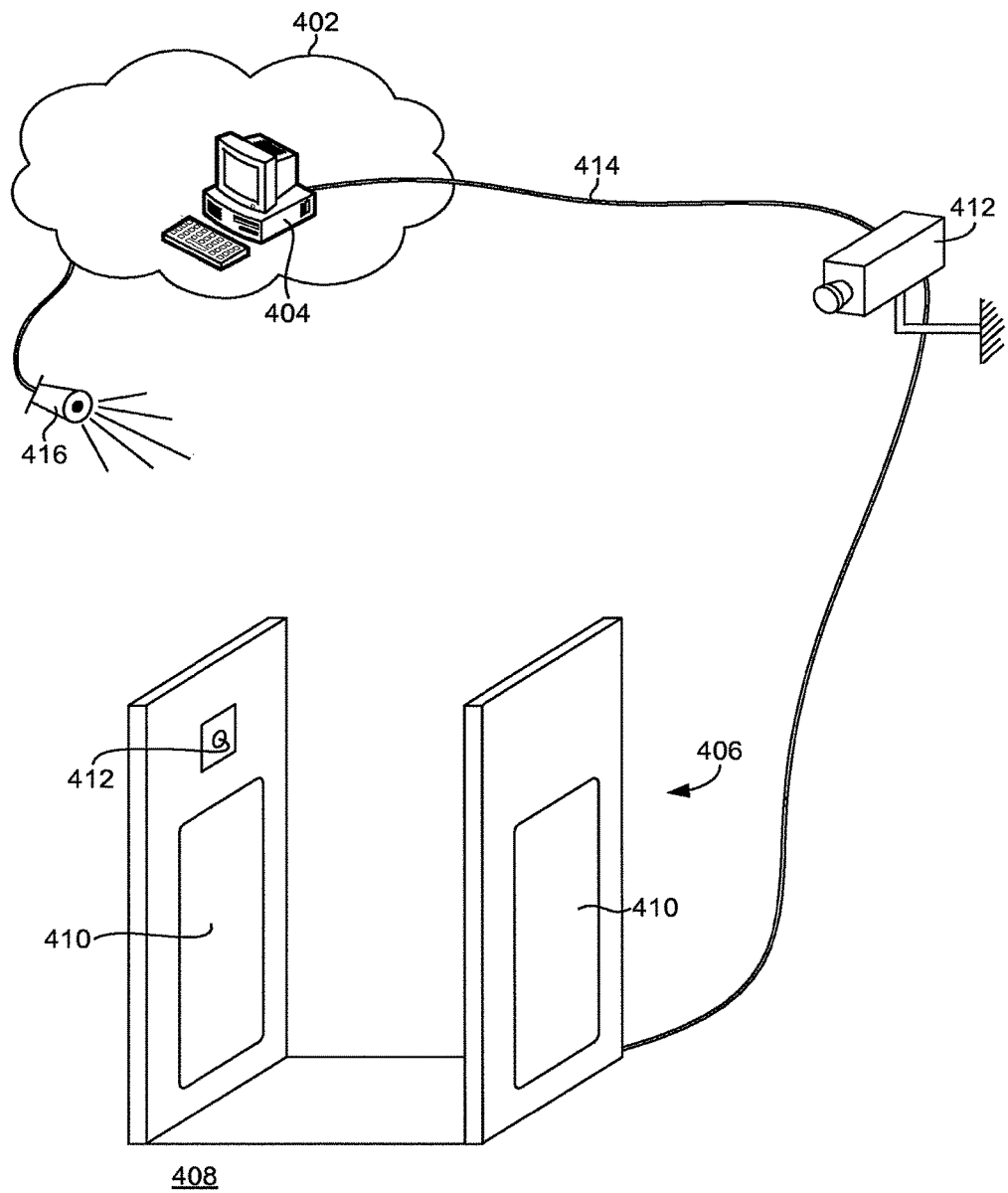
FIG. 4 is a schematic view of a wired data and image surveillance system in accordance with an alternate embodiment of the present invention.

Referring now to FIG. 4, an alternate embodiment of the present invention is depicted. For clarity purposes, components similar to those of FIG. 1 share similar numerical identifiers. However, in FIG. 4, the communication through the system 400 occurs across a wired network 414. Although the surveillance system is depicted as communicating across a wireless network 114 in FIG. 1 and a wired network 414 in FIG. 4, the communication can also occur across a combination of the two, as in a partially-wired network.

Referring back to FIG. 1, upon indication of a triggering event, the image surveillance device 112 records one or more images of a location of an item having an RFID tag. The triggering event occurs when the item having the RFID tag is within proximity of the one or more portal systems 106 or crosses through a threshold established by the one or more portal systems 106. The exact proximity to the one or more portal systems is an operator-defined specification. Examples of the proximity include crossing through the portal system 106, coming within a radius of the one or more portal systems 106 or coming within a cubic area encompassing the one or more portal systems 106.

The system 100, can operate in a manner such that the image surveillance device 112 is capable of operating in an active recording mode or a passive operating mode. In a passive operating mode, the image surveillance device 112 does not record one or more images until activated by a triggering event. However, in the active recording mode, the image surveillance device 112 records one or more images at a regular and pre-determined rate.

Furthermore, upon indication of a triggering event, an alarm 116 can be activated. The alarm 116, as shown in FIGS. 1 and 4, is coupled to the portal system 106 through the processing unit 102. The alarm 116 can be a variety of types and can be triggered to sound upon activation by the processing unit 102 or, if wired accordingly, directly by the portal system 106.

In addition to the alarm 116, the surveillance system 100 also transmits the indication of the triggering event to one or more monitoring systems or devices (not depicted). The monitoring system or device may be incorporated into the processing device 102 or may be separate such, as a closed-circuit security network that is monitored by security personnel. An indication of a triggering event can be communicated to external devices worn by or in view of monitoring personnel. For example, a text-based message indicating a triggering event has occurred and information relating to that event, such as location and information on the item, can be transmitted to a wireless communications device such as a personal digital assistant (PDA) or wireless phone. An audible indication or message can also be transmitted to a communications device capable of short radio transmissions.

The RFID tag contains data specific to the item on which it is located. For example, the RFID tag can store information including an item serial number, description, and price. When the indication of a triggering event occurs, in addition to notification of the triggering event being transmitted to the monitoring system or device, data specific to the item that is stored on the RFID tag can also be transmitted to the monitoring system or device.

The system 100 further comprises the capability of providing enhancements to the one or more images recorded by the video surveillance device 112. The enhancement options, which are typically stored on the processing device 102, include capturing still images from a video surveillance, focusing on a particular image, increasing an image resolution, increasing a quantity of images recorded per second (i.e. frames per second), altering the image colors from black and white to color and vise versa. The processing device 102 can also change the recorded image to infrared in the event of inferior lighting, or enable motion of the video surveillance device 112 to follow an RFID tag, or to insert a time and/or date stamp into the one or images. Although the enhancement options described above are with respect to one or more previously recorded images, the same enhancement options can be applied in real-time directly to the surveillance device 112, such that the images being recorded are already in an enhanced format.

Figure 5:
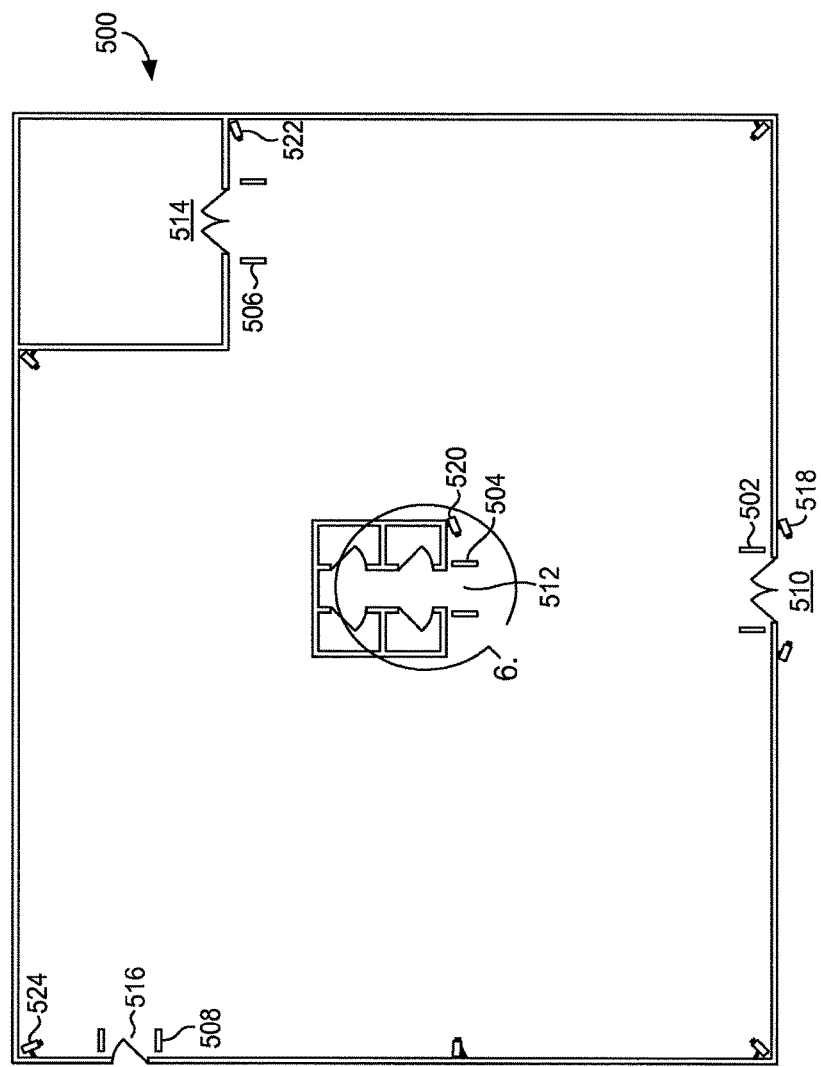
FIG. 5 is a depiction of a store diagram in which an embodiment of the present invention is utilized.

An example embodiment in which the present invention can operate is depicted in FIGS. 5-7 and FIG. 9. FIG. 5 depicts a general floor plan of a store 500 that utilizes the present invention. The store 500 includes portal systems 502, 504, 506, and 508 that are positioned adjacent to areas of interest 510, 512, 514, and 516, respectively. Also positioned adjacent to the areas of interest 510, 512, 514, and 516 are one or more image surveillance devices 518, 520, 522, and 524, respectively. Although these image surveillance devices are shown as separate components from the portal systems 502-508, it should be understood that the image surveillance devices could be incorporated into the portal systems 502-508, as previously discussed and depicted in FIGS. 1-3. Referring back to FIG. 5, additional image surveillance devices can be placed throughout the store 500 so as to monitor other areas as required.

Figure 6:
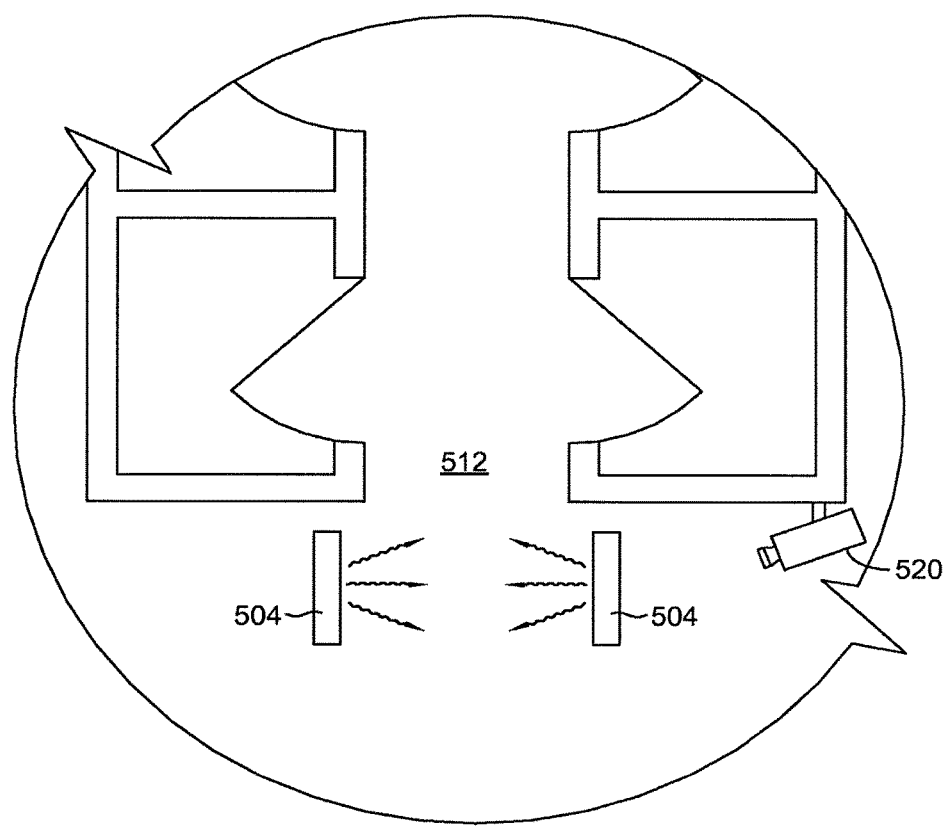
FIG. 6 is a depiction of a portion of the store diagram of FIG. 5 in which an embodiment of the present invention is utilized.
Figure 7:
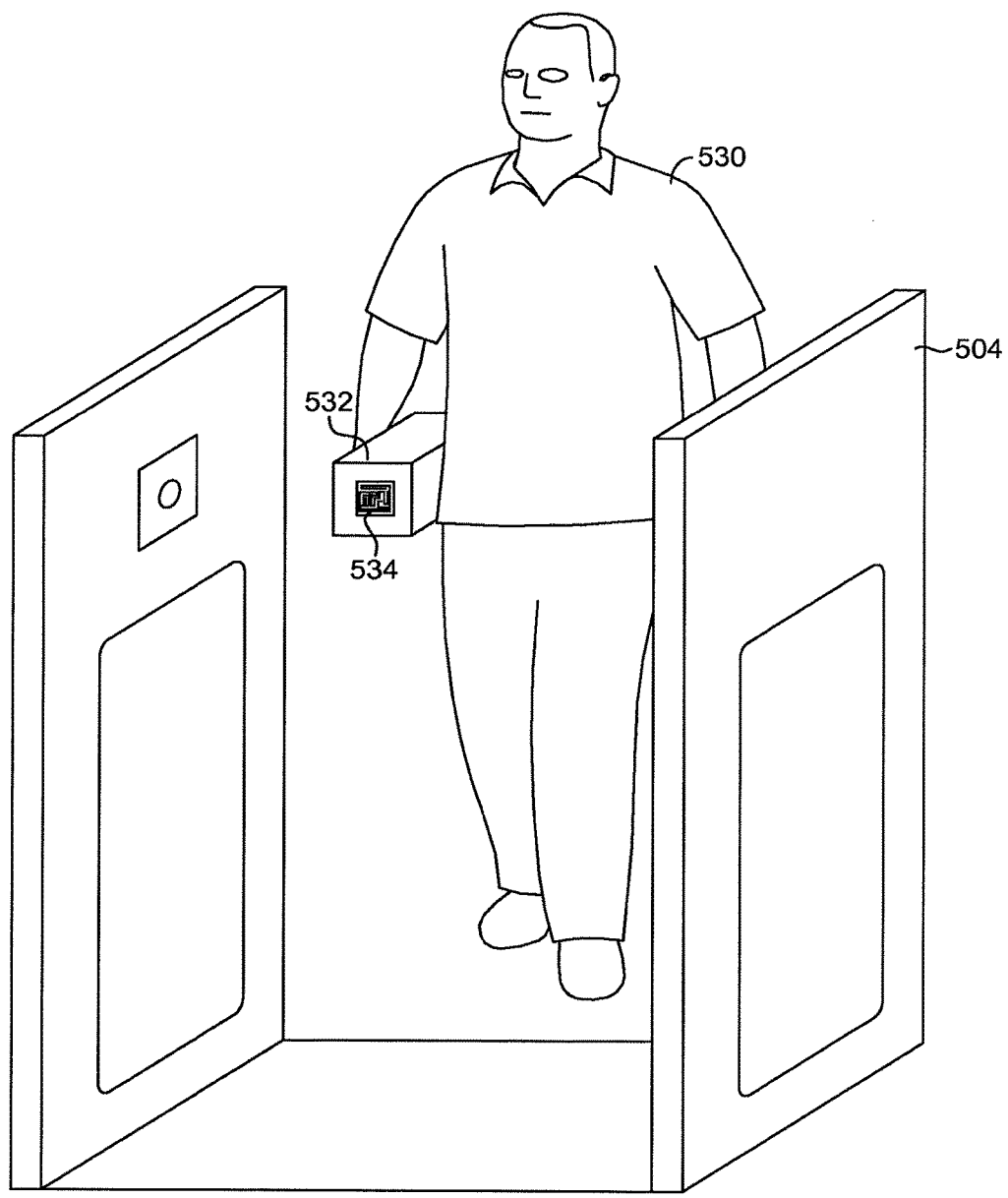
FIG. 7 is a depiction of a item with an RFID tag approaching a portal system in accordance with an embodiment of the present invention.

FIG. 6 provides a better view of the area of interest 512 of FIG. 5 that is monitored for the presence of an RFID tag by the portal system 504 and the image surveillance device 520. As it can be seen from FIG. 6, the portal system 504 emits a signal in an effort to detect the presence of an RFID tag within proximity of the portal system 504. In this depiction, the area of interest 512 is a dressing room of the store 500. As previously discussed, this area of interest 512 cannot be readily monitored due to privacy concerns, and thieves have taken advantage of this lapse in security by taking garments into the dressing room and removing the RFID tags, thereby preventing any detection of the garment leaving the store 500. However, by placement of the portal system 504 having an RFID tag reader, that is in communication with an image video surveillance device 520, one or more images of a subject 530, as depicted in FIG. 7, carrying an item 532 having an RFID tag 534 through the portal system 504, can be recorded by the image surveillance device. Therefore, should the item 532 be removed from the store 500, one or more images of the last known subject 530 having that item will be available for use by store and security personnel.

Figure 8A:
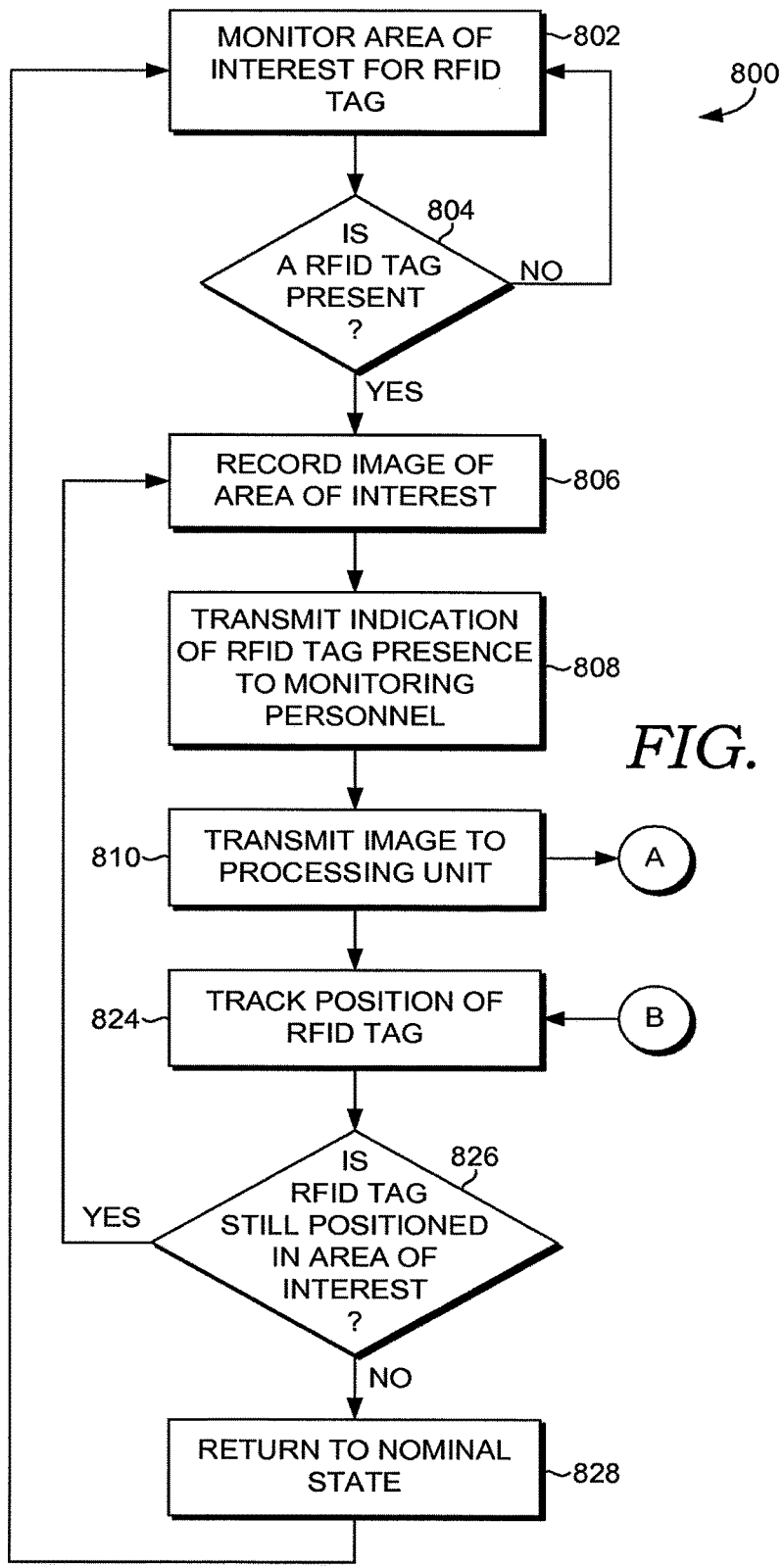
FIGS. 8A and 8B depict a flow diagram in accordance with an embodiment of the present invention; and, FIG. 9 is a depiction of a store diagram in which an alternate embodiment of the present invention is utilized.
Figure 8B:
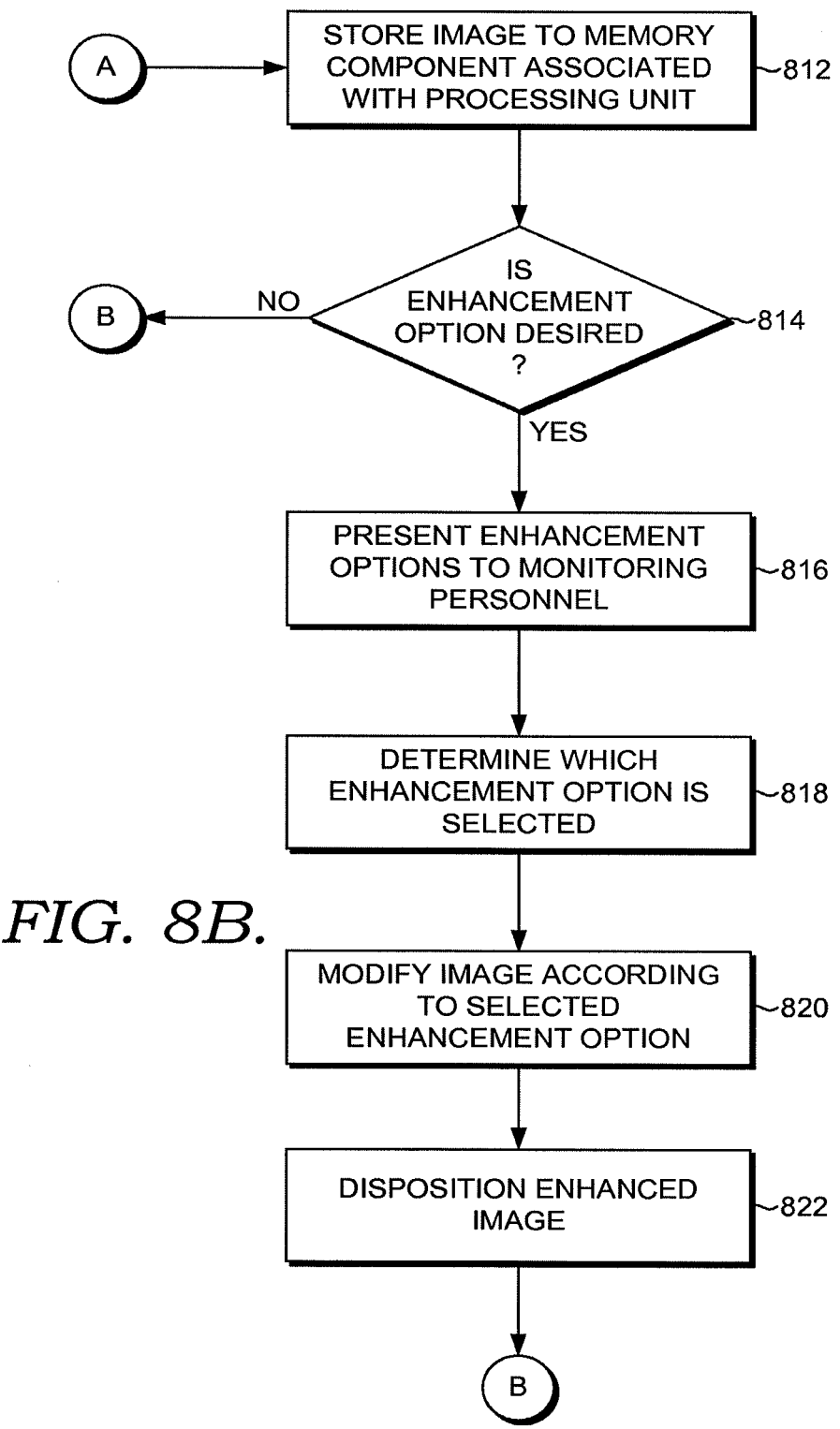

Referring to FIGS. 8A and 8B, in an alternate embodiment of the present invention, a method 800 of providing data and image surveillance is disclosed. In a step 802 an area of interest is monitored for a presence of a RFID tag, and in a step 804, a determination is made as to whether or not an RFID tag is present. If no RFID tag is present, then the process returns to the step 802 to continue monitoring for an RFID tag. However, if it was determined in the step 804 that an RFID tag is present within the area of interest, then in a step 806, one or more images of at least the area of interest are recorded through an image surveillance device, such as a video camera. Depending on the type of surveillance equipment utilized the one or more images may be either still images, a video clip, or a combination of the two media formats.

In a step 808, an indication of the presence of the RFID tag within the area of interest is transmitted to one or more monitoring systems or devices. As previously discussed, this transmission can occur in a variety of ways and through a variety of means. For example, if the RFID tag crosses through a threshold established by the portal system within a store, then only store personnel may be notified by way of an audible page or text prompt visible on in-store computers and cash registers. Alternately, if the RFID tag crosses through the threshold established by the portal systems at the entrance/exit of the store, indicating that a tagged item has left the store premises, then the transmission could also be sent to security personnel on the store premises or local law enforcement officials.

In a step 810, the one or more images captured by the surveillance device are transmitted to a memory component of a processing unit. Referring now to FIG. 8B, in a step 812, the one or more images are stored to a memory component associated with the processing unit. Once the one or more images are stored in the memory component, in a step 814, a determination is made as to whether or not an enhancement option to the one or more images is desired by the personnel operating or reviewing the images stored on the processing unit.

If an enhancement option is desired, then a series of enhancement options are presented in a step 816. Examples of the enhancements options presented in the step 816 include providing still images from a video, focusing on a particular image, increasing image resolution, increasing the quantity of images recorded per second (i.e. frames per second), changing the one or more images from black and white to color and vise versa. The enhancement options can also include changing the one or more images to infrared, enabling motion of the image surveillance device, and inserting a time and date stamp into the one or more images. Although the selection of the enhancement options are discussed in the context of as the images are being recorded and transmitted to the processing unit, it is important to note that enhancement of the one or more images can occur at a later time and not in conjunction with the recording of the one or more images.

In a step 818, a determination is made as to which enhancement option is selected. It is important to note that even while enhancement of the one or more images is occurring through the processing unit, the surveillance device maintains operation and continues to transmit any recorded images to the processing unit. In a step 820, the one or more images are modified according to the enhancement option selected. Then, in a step 822, the one or more images are processed according to a user's instructions. This can include storing the modified image to the memory component of the processing unit and transmitting the image to another system or device.

If an enhancement option is not chosen in the step 816, an enhancement option can be determined at a later time, and the process completes the processing of the image in the step 822. Referring back to FIG. 8A, the location of the RFID tag is tracked in a step 824. This tracking of the RFID tag can occur through a variety of surveillance equipment or additional RFID portals, and will be discussed in more detail below.

In a step 826, a determination is made as to whether or not the RFID tag is still within proximity of the area of interest. If the RFID tag is determined, either through image surveillance, indication from the portal system, or RFID tracking, to still be within proximity of the area of interest, then the process returns to the step 806 in which one or more images of at least the area of interest are again recorded. However, if in the step 826, the RFID tag is determined to no longer be within the area of interest, then the data and image surveillance system returns to a nominal state in a step 828.

As indicated above, the data and image surveillance system can track an RFID tag throughout a particular area, such as a store, once a triggering event occurs. A depiction of such an embodiment is shown in FIG. 9. A floor plan of a store 900 has a number of departments or regions 902, 904, and 906. In the floor plan of FIG. 9, region 902 corresponds to an electronics department, 904 to the cash registers and customer service area, and 906 to a shoe department. In FIG. 9, it can be seen that a triggering event occurs when an item having an RFID tag crosses a threshold established by a portal system 908 in the electronics department 902.

Upon indication of the triggering event, an image surveillance device 910 records one or more images of the area of interest, which, for this example, is adjacent to the portal system 908 and identified as area A in FIG. 9. Movement of the RFID tag throughout the store 900 is depicted by path 912, which is depicted to move between areas 902 and 906 and then areas 902 and 904. Once a tracking function is enabled, additional image surveillance devices 914, 916, and 918 are enabled to record images as the RFID tag passes within their proximity as well as additional portal systems 920. As depicted in FIG. 9, at least the image surveillance device 910 would capture one or more images at area A and at least the image surveillance device 914 would capture one or more images of area B. However, it is possible that the image surveillance device 916 could also capture one or more images at area B and as the RFID-tagged item moves towards area C. As the RFID-tagged item moves towards the area D adjacent to the front of the store 900, the image surveillance device 916 can follow the movement until an image surveillance device associated with the portal system 920 captures one or more images. As previously discussed, at the point at which the RFID tagged item crosses through the portal system 920, an alarm could be activated and outside security personnel could be notified. Upon indication of a triggering event within the store 900, an embodiment of the present invention has all of the image surveillance devices located at any exit enter into a record mode to ensure that an image is recorded, regardless of which exit is utilized.

Once the RFID-tagged item exits the store 900, another image surveillance device 918 records one or more images as the item moves into a parking lot 922. As previously discussed, the one or more images captured by each of the surveillance devices would be transmitted to a processing unit for storage and additional processing through the various enhancement options. Enhanced images can then be provided to store and law enforcement officials.

Depending on the preferences set by the operators of the data and image surveillance system, it is possible that image and data tracking can continue throughout the property on which the store 900 is located through additional surveillance devices located throughout the parking lot 922 or adjacent parking lots. In fact, image surveillance devices located throughout the parking lot can, upon selection of an enhancement option, identify particular information that may be helpful to law enforcement officials, such as license plate information, images of vehicles associated with subjects who have improperly removed RFID-tagged items from the store 900, or direct images of the subjects of interest that can be compatible with other types of software, such as facial recognition software.

An alternate form of the present invention comprises a video-based radio frequency (RFID) tag surveillance system comprising at least one portal system 106 located adjacent to an area of interest. This alternate embodiment is also depicted by FIGS. 1-4. The portal system 106 has one or more RFID tag readers 110 and is in communication with a video surveillance device 112 having at least one recording component for capturing one or more images of the area of interest. For the embodiment depicted in FIGS. 2 and 3, the recording component is located within the portal system 106.

Embodiments of the present invention are not limited to stores having RFID-tagged merchandise. Embodiments of the present invention can be applied to other environments such as the physical movement of valuable items. For example, portal systems coupled to data and image surveillance systems can be used to track shipment of RFID-tagged items from one location to another location. This is accomplished by determining which items pass through a portal system at a shipping location and monitoring images taken during loading of the RFID-tagged items into a transportation vehicle. Then, at a receiving location, images of the RFID-tagged items being unloaded can be monitored, and through a portal system at the receiving location, a determination can be made that all RFID-tagged items are now present within the confines of the receiving location. Some examples of this application include store-to-store transfers of inventory and monetary transfers between locations.

Another environment in which an embodiment of the present invention can be used is with respect to monitoring the safety of children in a public area, such as a restaurant, school, playground, or amusement park, where the children may or may not be supervised. Children would wear an RFID-tagged bracelet or have an RFID tag placed on an article of clothing, where the RFID tag contains information specific to that child such as the child's name, a physical description, names of parents and/or guardians and their contact information, and any known medical conditions. A data and image surveillance system is placed throughout the public area such that if a child leaves the public area, image surveillance devices adjacent to or incorporated into the portal systems throughout the public area capture the triggering event. These images will provide valuable information such as whether or not the child was alone and the condition of the child at the time of the triggering event. Furthermore, as previously discussed, enhancement options can be selected to modify and configure the one or more images recorded for use by security or law enforcement personnel. These images can easily and quickly be compiled with the data stored on the RFID tag for distribution as necessary.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method comprising:
    monitoring a portal adjacent to a predefined area of interest for a presence of a radio frequency identification (RFID) tag by sending an interrogation signal from an RFID reader located the portal, the predefined area of interest being an area that is not monitored by video;
    determining whether a user has entered the predefined area of interest through the portal with the RFID tag in response to the RFID reader receiving a response from the RFID tag to the interrogation signal;
    recording surveillance videos of at least the portal when the user with the RFID tag is determined to be within the area of interest;
    determining that the user has exited the portal based on the surveillance videos but that the RFID tag did not exit through the portal; and
    transmitting, to a monitor, an indication of the presence of the RFID tag within the area of interest.

2. The method of claim 1, wherein the transmitting the indication of an RFID tag occurs through audible alarm, visual alarm, or text-based message.

3. The method of claim 1, wherein the transmitting comprises transmitting at least the image to a memory component of a processor.

4. The method of claim 3, further comprising:
    modifying the image through one or more enhancement options, the one or more enhancement items comprising at least one of:
    providing still images;
    focusing on a particular image;
    increasing image resolution;
    increasing quantity of images recorded per second;
    changing the images from black and white to color and vice versa;
    changing the images to infrared;
    enabling motion of a video surveillance device; and
    inserting a time and date stamp into the images.

5. The method of claim 1, further comprising panning a first image surveillance device and tracking the RFID tag based on the radio frequency of the RFID tag within the area of interest until a second image surveillance device records one or more images of at least the area of interest, wherein the second image surveillance device is configured to monitor the area of interest.

6. The method of claim 1, further comprising tracking a position of the RFID tag within the area of interest based on the presence of a radio frequency of the RFID tag.

7. The method of claim 6, wherein tracking the position includes active movement of an image surveillance and a physical location tracking.

8. The method of claim 1, further comprising:
    determining a selection of an enhancement option to the image from a user;
    modifying the image according to the selection of the enhancement option; and
    processing the enhancement option of the image through a processing unit while recording through an image surveillance device.

9. A radio frequency identification (RFID) tag surveillance system comprising:
an RFID reader that is located at a portal that is adjacent to an area of interest and that sends an interrogation signal to an RFID tag that passes through the portal, wherein a user is determined to have entered the predefined area of interest through the portal with the RFID tag in response to the RFID reader receiving a response from the RFID tag to the interrogation signal;
an image surveillance device that records surveillance video of the portal when the user with the RFID tag is determined to be within the area of interest; and
a transmitter that transmits a notification when the user is determined to have exited the portal based on the surveillance videos but that the RFID tag did not also exit through the portal.

10. The surveillance system of claim 9, wherein at least the recording component of the video surveillance system is located proximate to the RFID tag reader.

11. The surveillance system of claim 9, wherein the RFID tag reader is coupled to the processing unit through a wired, wireless, or partially-wired network.

12. The surveillance system of claim 9, further comprising a portal system located adjacent to the area of interest, wherein the portal system comprises the RFID reader.

13. A data and image surveillance system comprising:
a radio frequency identification (RFID) reader that reads an RFID tag entering an area via the portal, wherein a user is determined to have entered an area via a portal system with the RFID tag in response to the RFID reader reading the RFID tag;
an image surveillance device that is in communication with the RFID reader and that records one or more images of an area where the RFID tag is located when the user with the RFID tag is determined to be within the area of interest; and
transmitting the one or more recorded images to a monitoring system when the user is determined to have exited the portal based on the surveillance videos but that the RFID tag did not also exit through the portal.

14. The system of claim 13, wherein the RFID reader is located within the portal system.

15. The system of claim 13, further comprising the portal system in communication with the RFID reader, wherein the portal system communicates across a wired, wireless, or partially-wired network.

16. The system of claim 13, further comprising:
a processor that modifies the one or more images through one or more enhancement options, the one or more enhancement items comprising at least one of:
providing still images;
focusing on a particular image;
increasing image resolution;
increasing quantity of images recorded per second;
changing the images from black and white to color and vice versa;
changing the images to infrared;
enabling motion of the video surveillance device; and
inserting a time and date stamp into the images.

17. The system of claim 13, wherein a selection from a user of an enhancement option to the one or more images is received, wherein the selection includes one or more instructions for processing the one or more images while being recorded.

18. The system of claim 13, wherein the triggering event occurs when an item having the RFID tag is within a proximity of the RFID reader or crosses through a threshold established by a portal system associated with the RFID reader.

19. The system of claim 13, further comprising an alarm that is activated upon the RFID tag being read by the RFID reader.

20. The system of claim 13, further comprising one or more portal systems located proximate to the area, wherein each of the one or more portal systems has a radio frequency identification (RFID) reader.

* * * * *